United States Patent
Nandi et al.

(10) Patent No.: US 7,964,061 B2
(45) Date of Patent: Jun. 21, 2011

(54) ROOFING MAT AND THE PROCESS FOR MAKING A ROOFING MAT USING MODIFIED UREA-FORMALDEHYDE BINDER

(75) Inventors: Souvik Nandi, Englewood, CO (US); Guodong Zheng, Englewood, CO (US); Jawed Asrar, Englewood, CO (US); Philip Francis Miele, Highlands Ranch, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 12/709,706

(22) Filed: Feb. 22, 2010

(65) Prior Publication Data

US 2010/0147477 A1    Jun. 17, 2010

Related U.S. Application Data

(62) Division of application No. 11/648,475, filed on Dec. 28, 2006, now Pat. No. 7,691,761.

(51) Int. Cl.
    *D21F 11/00* (2006.01)

(52) U.S. Cl. ........................................ 162/156; 428/147

(58) Field of Classification Search ............... 162/156, 162/164.1, 158, 179; 428/147; 524/55, 51, 524/56; 525/56, 190
See application file for complete search history.

(56) References Cited

U.S. PATENT DOCUMENTS

| | | |
|---|---|---|
| 4,112,174 A | 9/1978 | Hannes et al. |
| 4,258,098 A | 3/1981 | Bondoc et al. |
| 4,560,612 A | 12/1985 | Yau |
| 4,681,802 A | 7/1987 | Gaa et al. |
| 4,810,576 A | 3/1989 | Gaa et al. |
| 4,917,764 A | 4/1990 | Lalwani et al. |
| 5,362,842 A | 11/1994 | Graves et al. |
| 5,389,716 A | 2/1995 | Graves |
| 5,624,743 A | 4/1997 | Malhotra |
| 5,851,933 A | 12/1998 | Swartz et al. |
| 6,384,116 B1 * | 5/2002 | Chan et al. ................ 524/186 |
| 2005/0191922 A1 | 9/2005 | Xing et al. |
| 2008/0083522 A1 * | 4/2008 | Poggi et al. ................ 162/158 |
| 2008/0160258 A1 * | 7/2008 | Nandi et al. ................ 428/147 |

* cited by examiner

*Primary Examiner* — Arti Singh-Pandey
(74) *Attorney, Agent, or Firm* — Robert D. Touslee

(57) ABSTRACT

Provided is thermosetting urea-formaldehyde (UF) resin binder formulation modified with a thickener. The formulation preferably has a viscosity in the range of from 3 to 10 cP and a surface tension of from 35 to 50 mN/m, and is preferably prepared from a binder composition exhibiting a viscosity of from 175 to 250 cP.

9 Claims, No Drawings

ROOFING MAT AND THE PROCESS FOR MAKING A ROOFING MAT USING MODIFIED UREA-FORMALDEHYDE BINDER

BACKGROUND OF THE INVENTION

1. Field of the Invention

This application is a division of application Ser. No. 11/648,475, filed Dec. 28, 2006. This invention relates to a modified, thermosetting urea-formaldehyde resin composition useful for preparing a binder formulation, such as for making fiber mats, particularly glass fiber mats. The present invention also relates to a process of preparing the fiber mats using the binder formulation prepared with the resin composition and to the fiber mats prepared using the modified urea-formaldehyde resin composition in a binder formulation. In particular, the invention relates to a thermosetting urea-formaldehyde (UF) resin modified with styrene maleic anhydride containing a thickener with the resin composition being useful as a binder in roofing mats.

2. Description of Related Art

Glass fiber mats, fiber mats made from synthetic fibers and mats made from fiber blends find wide application in the building materials industry, for example, as insulation, as a substrate for making composite flooring, as a substrate for making siding (replacing similar sheets traditionally made using wood, cellulose or asbestos fibers), as substrate for printed circuit boards or battery separators, as filter stock, as tape stock, as reinforcement scrim in cementitious and non-cementitious coatings for masonry and as facing material for laminated articles such as foam composites and gypsum boards. One particular use is that in roofing mats for application in roofing shingles.

It is known to make reinforcing mats from glass fibers and to use these mats as substrates in the manufacture of a large number of roofing products such as shingles, built up roofing products, etc. Any known method of making nonwoven mats can be used, such as the conventional wet laid processes described in U.S. Pat. Nos. 4,112,174, 4,681,802 and 4,810,576, the disclosures of which are incorporated herein by reference. In these processes a slurry of glass fiber is made by adding glass fiber to a typical white water in a pulper to disperse the fiber in the white water forming a slurry having a fiber concentration of about 0.2-1.0 weight %, metering the slurry into a flow of white water and depositing this mixture on to a moving screen forming wire to dewater and form a wet nonwoven fibrous mat.

This wet nonwoven mat of glass fiber is then transferred to a second moving screen and run through a binder application saturating station where an aqueous binder mixture, such as an aqueous urea formaldehyde (UF) resin based binder mixture in water with about 24 weight percent, based on the dry weight of the UF resin, of a blend of 91.7 weight percent polyvinyl acetate homopolymer and 8.3 weigh percent of an acrylic tripolymer, is applied to the mat. This is followed by sucking off the excess binder and drying the unbonded, wet mat and curing (polymerizing) the UF based resin binder which bonds the fibers together in the mat. Preferably, the aqueous binder solution is applied using a curtain coater or a dip and squeeze applicator, but other methods of application such as spraying will also work.

In the drying and curing oven the mat is subjected to temperatures of 250-450 or 500 degrees F. for periods usually not exceeding 1-2 minutes and as little as a few seconds. Alternative forming methods include the use of well known processes of cylinder forming and "dry laying" using carding or random fiber distribution.

UF resins are most commonly used as a binder for fiber glass mats because of their suitability for the applications and their relatively low cost. Melamine formaldehyde resins are sometimes used for higher temperature applications. To improve the toughness of the mats, a combination of higher mat tear strength and mat flexibility, which is needed to permit higher processing speeds on roofing product manufacturing lines and for maximum roofing product performance on the roofs, it is common to modify or plasticize the UF resins as described above or with acrylic latexes or SBR latexes.

Because fiber mats made with an adhesive binder formulation consisting predominantly of a UF resin often are brittle, or because the strength properties of the mats may deteriorate appreciably subsequent to their preparation, especially when the mats are subjected to wet conditions, UF resin-based adhesive binder formulations have often been modified by fortifying the UF resin with a large amount of latex (emulsion) polymer, usually a polyvinyl acetate, vinyl acrylic or styrene-butadiene polymer, as noted above. Certain latexes have been shown to provide increased tensile strength and tear strength in the fiber mat. The use of styrene-butadiene latex-fortified, urea-formaldehyde resin compositions in preparing an adhesive binder formulation for making glass fiber mats is disclosed, for example, in U.S. Pat. Nos. 4,258,098; 4,560,612 and 4,917,764.

U.S. Pat. No. 4,917,764 highlights another problem sometimes encountered during the manufacture of fiber mats, especially when using the falling film curtain coater adhesive binder application technique. In particular, conventional UF resin-based adhesive binder formulations are sometimes deficient in providing an even deposition of the adhesive binder formulation on the mat. This uneven application of the adhesive binder formulation to the mat contributes to non-uniform mat properties.

It is an object of the present invention to overcome the foregoing problems associated with using urea-formaldehyde based binders in the preparation of glass mats.

SUMMARY OF THE INVENTION

Applicant has now determined that by controlling the rheological behavior of such UF resin-based adhesive binder formulations, even application of the binder can be achieved. This is true especially when using the falling film curtain coater adhesive binder application technique. In particular, applicant has discovered that by modifying a thermosetting UF resin composition with a thickener and hence controlling its viscosity, the rheological characteristic of a binder formulation made using the thermosetting UF resin composition is significantly improved, allowing the binder formulation to be applied evenly at high mat manufacturing speeds even using a curtain coater.

The invention is directed to a thermosetting urea-formaldehyde (UF) resin that has been modified with a thickener. The invention also is directed to an aqueous binder formulation containing as its major component the so-modified thermosetting, UF resin. Furthermore, the invention also is directed to a process for preparing a fiber mat, particularly a glass fiber mat, using the binder formulation, and to fiber mats produced by the method. Mats made using a binder formulation based on the modified thermosetting, UF resin of the present invention are useful, for example, as substrates in the manufacture of roofing shingles.

The invention is based on the discovery that by modifying the thermosetting urea-formaldehyde (UF) resin composition with a thickener to enhance/control its viscosity, which then is used to produce a binder formulation, binder formulations are obtained that exhibit improved processing characteristics. The resin composition is preferably controlled to a particular viscosity in the range of from 175 cP to 250 cP, and the binder formulation prepared therefrom preferably exhibits a viscosity in the range of from 3 to 10 cP and a surface tension of between 35 and 50 mN/m.

In particular, adhesive binder formulations made with the so-modified UF resin composition can be applied evenly to a non-woven fiber mat using a falling film curtain coater even at the high speed manufacturing conditions of current non-woven mat forming equipment. Fiber mats prepared using a binder formulated using the so-modified thermosetting UF resin composition thus exhibit more uniform structural properties, such as tensile and tear strength properties, in the machine and cross-machine directions.

DETAILED DESCRIPTION OF THE PREFERRED EMBODIMENTS OF THE INVENTION

The glass fibers which can be used to make mats can have various fiber diameters and lengths dependent on the strength and other properties desired in the mat as is well known. It is preferred that the majority of the glass fibers have diameters in the range of 3 to 25 microns, most preferably about 12 to 17 microns. Normally the glass fibers used all have about the same target length, such as 0.75, 1 or 1.25 inch, but fibers of different lengths and diameters can also be used to get different characteristics in a known manner. Fibers up to about 3 to 5 inches in length can be used in a wet process for making fiber glass mats and even longer fibers can be used in some dry processes. Generally the longer the fiber, the higher the tensile and strengths of the mat, but the poorer the fiber dispersion. While E, T and C type glass fibers are preferred for use in this invention, other types or glass fibers are also suitable, like A type, S type, etc. While the majority of the fibers used in the present invention are glass fibers, a minor portion of non glass fibers can also be used, such as up to about 25 wt. percent organic fibers such as nylon, polyester, polyethylene, polypropylene, etc.

Processes for making nonwoven fiber glass mats are well known and some of them are described in U.S. Pat. Nos. 4,112,174, 4,681,802 and 4,810,576, which references are hereby incorporated into this disclosure by reference, but any known method of making nonwoven mats can be used. The preferred technique for the making of mats of the present invention is forming a dilute aqueous slurry of fibers and depositing the slurry onto an inclined moving screen forming wire to dewater the slurry and form a wet nonwoven fibrous mat, on machines like a Hydroformer® manufactured by Voith-Sulzer of Appleton, Wis., or a Deltaforme® manufactured by ValmetlSandy Hill of Glenns Falls, N.Y. Next, the wet, unbonded mat is transferred to a second moving screen running through a binder application saturating station where the modified UF resin based binder in aqueous solution is applied to the mat. The lien speed can range from 900 to 930 feet/minute. The excess binder is removed, and the wet mat is transferred to a moving oven belt where the unbonded, wet mat is dried and cured, polymerizing the UF based resin binder bonding the fibers together in the mat. Preferably, the aqueous binder solution is applied using a curtain coater or a dip and squeeze applicator. A curtain coater is preferred. In the drying and curing oven the mat is subjected to temperatures of 250-450 or 500 degrees F. for periods usually not exceeding 1 or 2 minutes and frequently less than 40 seconds. Alternative forming methods include the use of well known cylinder forming and "dry laying".

Any UF binder solution can be used but a preferred UF binder suitable for modification and use according to the present invention is an aqueous UF binder called G 41 manufactured by Georgia Pacific Resin, Inc. of Atlanta, Ga. which has the following approximate characteristics:

| | |
|---|---|
| Solids as received | 54-57 wt % |
| Viscosity | 85-200 cP |
| pH | 6.7-7.9 |
| Specific Gravity | 1.22-1.24 |
| Free Formaldehyde | 0.5 wt % max |

(This property is not important with regard to performance of the resin, but is desirable from an environmental standpoint.)

More particularly, the process of forming a non-woven fiber mat, and especially a heat resistant fiber mat, such as a glass fiber mat, in accordance with the present invention generally begins with fibers of suitable length and diameter for the intended application, such as chopped bundles of glass. While reference is made hereinafter to using chopped bundles of glass fibers, other fiber types, e.g., mineral fibers, synthetic fibers, such as polyethylene, polypropylene, polyester and nylon fibers, and mixtures of various fiber types, and other forms of fibers such as continuous strands, may also be used.

Generally, fibers having a length of about ¼ inch to 5 inches (about 6 to about 140 mm) and a diameter of about 3 to 25 microns are used for most non-woven mat applications. Short and long fibers can be mixed to form a mat web of increased fiber entanglement. Glass fiber bundles, which may contain from about 20 to 500, or more, of such fibers, are available commercially from Owens-Corning Fiberglass and Johns-Manville.

The fibers are added to an aqueous dispersant medium to form an aqueous slurry, known in the art as "white water." The white water typically contains about 0.5% by weight fibers. Any viscosity modifier or dispersant, including those commonly used in the past, can be used in the practice of the present invention including hydroxyethyl cellulose, ethoxylated amines, polyacrylamides, amine oxides and the like. Again, the present invention is not limited to any specific viscosity modifier. The amount of viscosity modifier used should be effective to provide the viscosity needed to suspend the fibers in the white water as needed to practice the method used to form the wet laid mat. The white water viscosity is generally in the range of 1 to 20 cPs, preferably 1.5 to 8 cPa. The fiber slurry then is agitated to form a workable, uniform dispersion of fibers having a suitable consistency. The viscosity modifier also may contain other conventional additives known in the art. These include dispersion aids, surfactants, lubricants, defoamers and the like.

The fiber/water dispersion then is passed to a mat-forming machine typically containing a mat-forming screen. On route to the screen, the dispersion often is diluted further with water to a lower fiber concentration. The fibers are collected at the screen in the form of a wet fiber mat and excess water is removed by gravity or, more often, by vacuum assist in a conventional manner.

A binder formulation, made by diluting a thermosetting UF resin composition of the present invention with water, then is applied to the gravity- or vacuum-assisted dewatered wet fiber mat. The UF resin composition used is preferably of a controlled viscosity controlled by adding sufficient thickener. The addition of a thickener allows one to more easily and accurately control the viscosity y of the UF resin composition, without necessarily impacting the desired chemistry or molecular weight of the resin. The UF resin composition, therefore, generally comprises the UF resin, thickener and water in amounts such that the viscosity of the resin composition ranges from 175 to 250 cP, more preferably from 190 to 230 cP, and most preferably from 200 to 220 cP. The control of the viscosity of the resin composition allows excellent control of the resulting binder formulation.

The viscosity of the UF binder formulation, prepared from the resin composition described above, is preferably controlled to between 3 to 10 cP, more preferably from 3.5 to 8 cP, and most preferably from 4 to 7 cP. The binder formulation is prepared by further dilution of the resin composition, e.g., to 15 to 22 wt % solids, more particularly from 17 to 19 wt % solids. The surface tension of the binder formulation is also preferably controlled such that it is in the range of from 35 to 50, more preferably from 38 to 48 and most preferably from 40 to 47mN/m. The surface tension can be controlled by adding a surfactant to the formulation. Control of the viscosity and surface tension allows one to realize the advantages of uniform coating. Application of the binder composition may be accomplished by any conventional means, such as by soaking the mat in an excess of binder solution or suspension, or by coating the mat surface with binder by means of a binder applicator, especially by use of a falling film curtain coater.

The thermosetting urea-formaldehyde (UF) resin used as the major component of the adhesive binder formulation is prepared from urea and formaldehyde monomers and UF precondensates in manners well known to those skilled in the art. Suitable resins are commercially available and the present invention can advantageously be applied to all thermosetting UF resin compositions suitable for making binder compositions for fiber mats. Skilled practitioners recognize that the urea and formaldehyde reactants are commercially available in many forms. Any form which can react with the other reactants and which does not introduce extraneous moieties deleterious to the desired reaction and reaction product can be used in the preparation of urea-formaldehyde resins useful in the invention.

One useful class of thermosetting UF resins for use in preparing an adhesive binder formulation in accordance with the present invention is disclosed in U.S. Pat. Nos. 5,362,842 and 5,851,933, the disclosure of which are incorporated herein by reference.

As well-understood by those skilled in the art, formaldehyde for making a suitable thermosetting UF resin is available in many forms. Paraform (solid, polymerized formaldehyde) and formalin solutions (aqueous solutions of formaldehyde, sometimes with a small amount of methanol, in 37 percent, 44 percent, or 50 percent formaldehyde concentrations) are commonly used forms. Formaldehyde also is available as a gas. Any of these forms is suitable for use in preparing a thermosetting UF resin in the practice of the invention. Typically, formalin solutions are preferred as the formaldehyde source for ease of handling and use.

Similarly, urea is available in many forms. Solid urea, such as prill, and urea solutions, typically aqueous solutions, are commonly available. Further, urea may be combined with another moiety, most typically formaldehyde and urea-formaldehyde adducts, often in aqueous solution. Any form of urea or urea in combination with formaldehyde is suitable for use in the practice of the invention. Both urea prill and combined urea-formaldehyde products are preferred, such as Urea-Formaldehyde Concentrate or UFC 85. These types of products are disclosed in, for example, U.S. Pat. Nos. 5,362,842 and 5,389,716 and are well known to skilled workers.

Any of the wide variety of procedures used for reacting the principal urea and formaldehyde components to form an aqueous thermosetting UF resin composition also can be used, such as staged monomer addition, staged catalyst addition, pH control, amine modification and the like. The present invention is not to be limited to a restricted class of UF resins for making fiber mats. Generally, the urea and formaldehyde are reacted at a mole ratio of formaldehyde to urea in the range of about 1.1:1 to 4:1, and more often at an F:U mole ratio of between about 2.1:1 to 3.2:1. Generally, the U-F resin is highly water dilutable, if not water soluble.

Many thermosetting urea-formaldehyde resin compositions, which may be used in the practice of this invention, are commercially available. Urea-formaldehyde resins such as the types sold by Georgia Pacific Resins, Inc. for glass fiber mat applications, those sold by Dynea may be used. These resins are prepared in accordance with the previous teachings and contain reactive methylol groups, which upon curing form methylene or ether linkages. Such methylol-containing adducts may include N,N'-dimethylol, dihydroxymethylolethylene; N,N'bis(methoxymethyl), N,N'-dimethylolpropylene; 5,5-dimethyl-N,N'dimethylolethylene; N,N'-dimethylolethylene; and the like.

Thermosetting urea-formaldehyde resins useful in the practice of the invention generally contain 45 to 75% by weight, and preferably, 50 to 65% by weight nonvolatiles, generally have a viscosity (before modification in accordance with the present invention) of about 50 to 600 cPs, preferably 150 to 400 cPs, normally exhibit a pH of 7.0 to 9.0, preferably about 7.5 to 8.5, and often have a free formaldehyde level of not more than about 3.0%, often less than 1% and a water dilutability of 1:1 to 100:1, preferably 5:1 and above.

The reactants for making the UF resin may also include a small amount of resin modifiers such as ammonia, alkanolamines, or polyamines, such as an alkyl primary diamine, e.g., ethylenediamine (EDA) and styrene maleic anhydride (SMA). Additional modifiers, such as melamine, ethylene ureas, and primary, secondary and tertiary amines, for example, dicyanodiamide, can also be incorporated into UF resins used in the invention. Concentrations of these modifiers in the reaction mixture often will vary from 0.05 to 15.0/o by weight of the UF resin solids. These types of modifiers promote hydrolysis resistance, polymer flexibility and lower formaldehyde emissions in the cured resin. Further urea additions for purposes of scavenging formaldehyde or as a diluent also may be used.

In accordance with the present invention, the thermosetting UF resin is preferably modified by the addition of SMA. The viscosity of the UF resin is also increased by the addition of a thickener. As discussed above, the addition of the thickener is used to preferably control the viscosity of the resin composition to allow easy control of the viscosity and surface tension of the ultimate binder formulation. As noted above, the present invention is based on the discovery that the binder formulation of the present invention can applied more evenly to a non-woven fiber mat, such as by use of a falling film curtain coating applicator, especially at the high machine speeds common to conventional mat manufacturing operations. Indeed, using a binder formulated with the modified UF resin composition of the present invention and applied by a curtain coater, even coating of the binder on the fiber mat is achieved.

In the context of the present invention, thickening agents are added to control and increase the viscosity of the resin composition. These thickening agents are polymeric-type materials that are at least partially water soluble and which, when added to a thermosetting UF resin composition, increase the resin's viscosity without substantially modifying other resin properties. Representative of such thickening agents are polysaccharides, such as xanthan gum, guar gum, modified starches and the like; neutralized polyacrylic acid, such as sodium polyacrylate, a cellulose derivative, such as carboxymethyl cellulose and hydroxyethyl cellulose (and their soluble salts), polyacrylamides, and polyvinylalcohols. The thickening agent generally has a weight average molecular weight of at least about 100,000 and generally below about 2,000,000, more usually the thickening agent has a weight average molecular weight of at least about 200,000 and generally below about 1,000,000. Usually, the thickening agent is simply added to the UF resin composition.

To prepare the preferred modified UF resin composition, usually the SMA is simply added to a previously prepared aqueous thermosetting UF resin composition in a desired amount and under an ambient condition. Alternatively, it is also possible to include the SMA in a reaction mixture at some point during the time period in which the UF resin composition is prepared, for example during the methylolation step, during the condensation portion of the UF synthesis or later when taking steps to reduce free formaldehyde. This same procedure can be used to modify the UF resin with other resin modifiers as well. Upon addition of the thickener to further modify the resin composition, the aqueous, so-modified UF resin typically has a Brookfield viscosity in the range of from 175 to 250 cP, and more preferably from 190 to 230 cP, at a non-volatiles (solids) content of 45 to 70% by weight. As known to those skilled in the art, when used to prepare an adhesive binder for making fiber mats, the thermosetting UF resin typically is diluted with water, often to approximately 5 to 35% solids (by weight) and more usually to 12 to 30% solids (by weight), and most preferably from 17 to 19% solids (by weight) before use.

In order to insure suitable storage stability of the thickener modified thermosetting UF resin composition and proper performance when the UF resin is used in the adhesive binder formulation, it is desirable that the pH of the aqueous binder formulation be adjusted to a pH within the range of about 6 to 9, and more preferably between about 7 and 8.5. Too low a pH may cause premature curing of the UF resin and incompatibility of the two constituents; while too high a pH may retard curing of the composition on heating when it is used.

The binder formulation also generally contains a surfactant. The addition of the surfactant, which can be any suitable cationic, anionic or non-ionic surfactant, is to control the surface tension of the formulation. Control of the surface tension, together with the viscosity allows one to realize excellent coating properties. The surfactant is added in amounts necessary to achieve a surface tension of from 35 to 50, more preferably from 38 to 48, and most preferably from 40 to 47 mN/m.

The adhesive binder formulation may also contain a variety of other known additives such as a silica colloid to enhance fire resistance, antifoamers, biocides, pigments, and the like, normally in small proportions relative to the modified UF resin composition. As noted above, following synthesis of the UF resin and as part of the formulation of the binder composition of the present invention, it also is common to back-add additional urea to the resin composition. Any form of urea can be used, including UF concentrates.

As an example of preparing the binder formulation, an SMA modified UF resin containing a thickener and exhibiting a viscosity of about 220 cP was diluted to 17 to 19% solids. The resulting binder formulation exhibited a viscosity in the range of from 4 to 7 cP at various shear rates:

| Shear rate (1/s) | Viscosity (cP) |
|---|---|
| 0.40 | 5.92 |
| 0.63 | 4.55 |
| 1.00 | 4.30 |
| 1.59 | 4.54 |
| 2.51 | 4.56 |
| 3.98 | 4.53 |
| 6.31 | 4.59 |
| 10.00 | 4.74 |
| 15.85 | 4.65 |
| 25.12 | 4.50 |
| 39.81 | 4.36 |
| 63.10 | 4.26 |
| 100.00 | 4.25 |
| 158.50 | 4.26 |
| 251.20 | 4.29 |
| 398.10 | 4.35 |
| 631.00 | 5.11 |
| 1000.00 | 6.76 |

Upon addition of surfactant in accordance with the present invention, the binder formulation also would exhibit a surface tension in the range of from 175 to 250 mN/m.

The amount of binder formulation applied to the nonwoven mat also can vary considerably in the broad practice of the present invention, but loadings in the range of about 3 to about 45 percent by weight, preferably about 10 to about 40 percent by weight, and more usually about 15 to about 30 percent by weight, of nonvolatile binder solids based on the dry weight of the bonded mat, will be found advantageous in preparing thin mats for construction-related applications. For inorganic fibrous mats, this value can normally be confirmed by measuring the percent loss on ignition (LOI) of the nonwoven fiber mat product. Ways of assessing the adhesive binder loading for other fiber materials will be apparent to skilled workers.

As indicated earlier, the adhesive binder formulation made using the modified UF resin of this invention can be employed with any of the wide variety of fibers that can be formed into mats in any suitable manner. The fibers maybe organic or inorganic, preferably inorganic fibers are used. Inorganic fibers include, but are not limited to, glass fibers, mineral fibers, ceramic fibers, graphite fibers, metal fibers and metal coated glass or graphite fibers. Asbestos fibers also could be used, but are normally undesirable for health reasons. Organic fibers include, but are not limited to, acrylic, aromatic polyamide, polyester, cellulosic fibers, and polyolefin fibers. Inorganic fibers and especially glass fibers are generally preferred.

The adhesive binder formulation sets or cures at elevated temperatures below the decomposition temperature of the UF resin. The setting or curing of the adhesive binder normally can occur at temperatures from about 135° C. to about 300° C., preferably from about 135° C. to about 275° C. At these temperatures, the binder will typically dry and cure in periods ranging from about 2 seconds to about 60 seconds. Although the binder may cure more rapidly at higher temperatures, excessively high temperatures can cause deterioration of the binder or the fibers of the mat, which in turn causes a deterioration of the bonded mat physical and functional properties. Of course, lower temperatures and/or longer times can also be employed if desired.

The finished fiber mat product generally contains between about 55% and 97% by weight fibers, usually glass fibers, and between about 3% and 45% by weight of cured binder, 15-30% of binder being most preferable.

The so-modified UF resin binder of this invention may also have application in the manufacture of fiberglass insulation.

Fiberglass mats are typically made by spraying a dilute aqueous solution of the resin binder onto a moving mat or blanket of non-woven glass fibers, often hot from being recently formed, and then heating the mat or blanket to an elevated temperature in an oven to cure the resin.

While the invention has been described with reference to certain preferred embodiments, and exemplified with respect thereto, those skilled in the art will appreciate that various changes, substitutions, modifications and omissions may be made without departing from the spirit of the invention. Accordingly, it is intended that the scope of the present invention be limited solely by that of the following claims. Unless otherwise specifically indicated, all percentages are based on weight.

We claim:

1. A process for making a non-woven fiber mat comprising (a) forming an aqueous dispersion of fibers; (b) passing the dispersion through a mat forming screen to form a wet non-woven mat and (c) applying a thermosetting urea-formaldehyde binder formulation comprising urea-formaldehyde resin, thickener, surfactant and water, and exhibiting a surface tension of from 35 to 50 mN/m, to the wet non-woven mat.

2. The process of claim 1 wherein the thermosetting urea-formaldehyde binder composition is modified with SMA.

3. The process of claim 1, wherein the thermosetting urea-formaldehyde binder formulation has a solids content of from 5 to 35% by weight.

4. A fiber mat made in accordance with the process of claim 1.

5. A fiber mat made in accordance with the process of claim 2.

6. A fiber mat made in accordance with the process of claim 3.

7. A roofing shingle comprising a substrate comprised of the fiber mat of claim 4.

8. The process of claim 1, wherein the thickener is selected from the group consisting of polysaccharides; neutralized polyacrylic acids; cellulose derivatives; polyacrylamides; polyvinyl alcohols and mixtures thereof.

9. The process of claim 1, wherein the formulation exhibits a surface tension of from 40 to 47 mN/m.

* * * * *